(12) United States Patent
McCall

(10) Patent No.: US 9,926,693 B2
(45) Date of Patent: Mar. 27, 2018

(54) WATER-SAVING ACCESSORY FOR A TOILET, BASIN THEREOF, AND TOILET WITH WATER-SAVING FEATURE

(71) Applicant: Larry McCall, Hot Springs, NC (US)

(72) Inventor: Larry McCall, Hot Springs, NC (US)

( * ) Notice: Subject to any disclaimer, the term of this patent is extended or adjusted under 35 U.S.C. 154(b) by 32 days.

(21) Appl. No.: 15/187,099

(22) Filed: Jun. 20, 2016

(65) Prior Publication Data
US 2017/0362806 A1 Dec. 21, 2017

(51) Int. Cl.
*E03D 3/12* (2006.01)
*A47K 13/24* (2006.01)
*F16K 11/087* (2006.01)

(52) U.S. Cl.
CPC ............. *E03D 3/12* (2013.01); *A47K 13/24* (2013.01); *F16K 11/087* (2013.01)

(58) Field of Classification Search
CPC ................................................. E03D 1/142
USPC ....................................... 4/324–327
See application file for complete search history.

(56) References Cited

U.S. PATENT DOCUMENTS

| | | | | |
|---|---|---|---|---|
| 5,245,711 A | * | 9/1993 | Oldfelt | B64D 11/02 4/431 |
| 5,987,659 A | * | 11/1999 | Cannizzaro | E03D 9/085 4/420.2 |
| 2002/0189669 A1 | * | 12/2002 | Lappalainen | E03F 1/006 137/205 |

* cited by examiner

*Primary Examiner* — Lori Baker
(74) *Attorney, Agent, or Firm* — IP Strategies

(57) ABSTRACT

A water-saving accessory for a toilet includes a basin, a three-port valve, and first and second lengths of tubing. The basin has inlet and outlet ports and is configured to be coupled to the toilet bowl or toilet seat. The valve is configured to be coupled to a fluid supply line. The first length of tubing is configured to be attached at a first end to the valve and at a second end to the basin inlet port. The second length of tubing is configured to be attached at a first end to the basin outlet port. The valve can be configured to be coupled to a flush line for the toilet bowl such that fluid is normally supplied from the fluid supply line to the flush line, and to be actuatable to divert fluid from the fluid supply line to the first length of tubing.

21 Claims, 1 Drawing Sheet

US 9,926,693 B2

WATER-SAVING ACCESSORY FOR A TOILET, BASIN THEREOF, AND TOILET WITH WATER-SAVING FEATURE

FIELD OF THE INVENTION

The present invention relates to water-saving designs for toilets.

BACKGROUND OF THE INVENTION

Conventional toilets flush away liquid and solid waste with fresh water provided by an outside source. Typically, the source is the household water supply, and therefore clean, potable water is used to flush the waste into the septic or sewer system. It is becoming more common to use gray water as a source, but in either case a measured amount of fresh water is used. The amount of water used to flush the waste is related to the amount of water in the bowl when it is used. Many toilets are now designed to use two different measured amounts of water, depending on the application. A typical amount of water is used to flush away solid waste, whereas a smaller amount of water is used to flush away liquid waste. Although this represents a water savings, the amount of water used is still much more than necessary to flush away the typical amount of liquid waste present in the toilet. Because a certain amount of water is present in the bowl before use, and that water, along with the liquid waste, must all be flushed away, it is not possible to reduce the amount of flush water used with the conventional setup. However, if an alternative basin were to be used for the capture of liquid waste only, a much smaller amount of water could be used to flush the waste away. Thus, a design having a different basin for receiving liquid waste and using a smaller amount of water for flushing would be beneficial. Savings based on the cumulative amount of water used for flushing enables by such a design would be significant.

SUMMARY OF THE INVENTION

According to an aspect of the invention, a water-saving accessory for a toilet includes a basin, a three-port valve, a first length of tubing, and a second length of tubing. The basin has an inlet port and an outlet port and is configured to be coupled to an inside edge of a bowl of the toilet. The three-port valve is configured to be coupled to a fluid supply line. The first length of tubing is configured to be attached at a first end to the valve and at a second end to the inlet port of the basin. The second length of tubing is configured to be attached at a first end to the outlet port of the basin.

When assembled, the first length of tubing is attached to the inlet port of the basin, the second length of tubing is attached to the outlet port of the basin, and the first length of tubing is attached at the first end to the valve.

The valve can also be configured to be coupled to a flush line for the toilet bowl such that fluid is normally supplied from the fluid supply line to the flush line. The valve can be configured to be actuatable to divert fluid from the fluid supply line to the first length of tubing. The diverted fluid can be a measured amount, which can be selectable.

The second length of tubing can be configured such that a second end can be disposed in an S-bend of the toilet, below a low point of the S-bend.

The basin can be constructed from one or more materials including at least one of plastic, ceramic, and metal.

According to another aspect of the invention, a toilet includes a bowl, a basin, a three-port valve, a first length of tubing, and a second length of tubing. The bowl has an inlet port configured to be coupled to a second end of a flush line, and an outlet port having an S-bend. The basin has an inlet port and an outlet port and is coupled to an inside edge of the bowl. The first length of tubing is attached at a first end to the valve and at a second end to the inlet port of the basin. The second length of tubing is attached at a first end to the outlet port of the basin. A second end of the second length of tubing is disposed below a low point of the S-bend.

The valve can be configured such that fluid is normally supplied from the fluid supply line to the flush line. The valve can be configured to be actuatable to divert fluid from the fluid supply line to the first length of tubing. The diverted fluid can be a measured amount, which can be selectable.

The basin can be constructed from one or more materials including at least one of plastic, ceramic, and metal.

According to another aspect of the invention, a basin has an inlet port and an outlet port and is configured to be coupled to an inside edge of a bowl of the toilet. The basin can be constructed from one or more materials including at least one of plastic, ceramic, and metal.

According to another aspect of the invention, a toilet seat includes a sitting surface that is configured to be coupled to the body of the toilet and to support the weight of a person sitting on the sitting surface, and the basin, which is coupled to, attached to, or integrally formed with an inside front edge of the sitting surface of the seat.

DETAILED DESCRIPTION OF THE INVENTION

Figure 1:
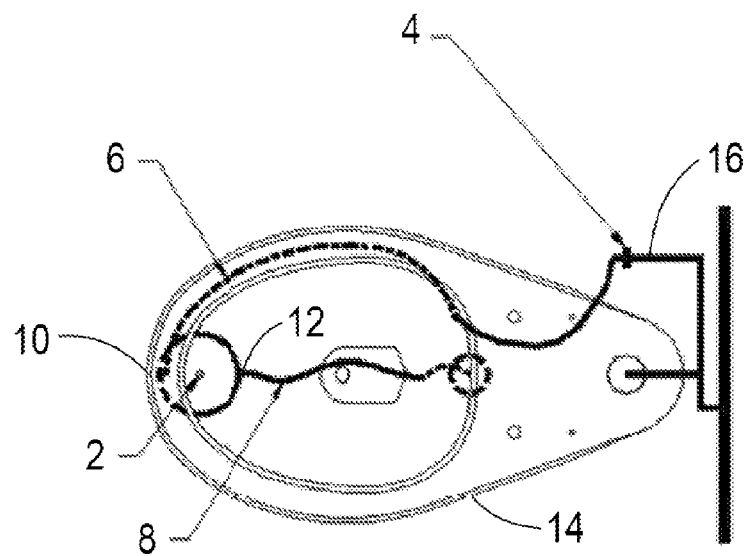
FIG. 1 is a plan view illustration of an embodiment of the toilet accessory according to the invention, coupled to a conventional toilet.
Figure 2:
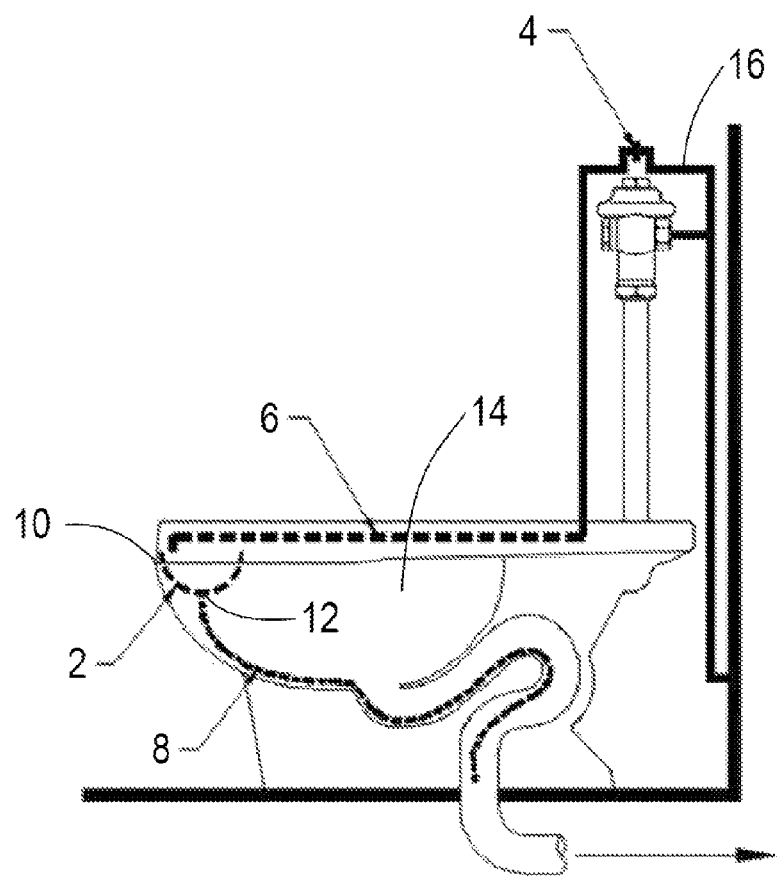
FIG. 2 is a side view illustration of an embodiment of the toilet accessory according to the invention, coupled to a conventional toilet.

As shown in FIGS. 1 and 2, the water-saving accessory can be assembled and attached to a conventional toilet to provide an alternative, low-water flush operation for liquid waste. The accessory includes a smaller urinary basin 2 (auxiliary urinary bowl), a three-port valve 4, a first length of tubing 6 (auxiliary flush line), and a second length of tubing 8 (auxiliary flush discharge line). The basin 2 has an inlet port 10 and an outlet port 12. Preferably, inlet port 10 is located near an upper rim of the basin 2, and the outlet port 12 is located near a bottom of the basin 2. The basin 2 is configured to be coupled to the toilet bowl so as to hang inside the front lip of the bowl 14, and can be made from any suitable material or combination of materials, such as plastic, metal, and ceramic. Thus, the basin 2 can include a hanger that loops over the lip of the bowl 14, suction cups that attached to the inside of the bowl or an inside surface of the lip of the bowl 14, a clamp, or any other mechanism that can hold the basin 2 in place such that it is concave-up and positioned to capture urine flow without otherwise hindering use of the toilet. The basin 2 should also be sized appropriately, that is, large enough to capture the urine flow with minimal overflow or splashing but not so large as to get in the way of a user.

Alternatively, because use of the invention necessitates that the toilet seat remain down, the basin 2 can be coupled or attached to the toilet seat instead of the lip of the bowl 14, and the seat can be fixed in the downward position if desired, such as by a clip or other mechanism. For example, suction cup on the basin 2 can attach to the underside of the front edge of the seat, or the basin 2 can be clamped or otherwise coupled to both the toilet and the seat.

The three-port valve 4 is configured to be coupled in a T-formation between the fluid supply line 16 to the toilet, that is, the main water line, and the flush line that normally supplies water to the toilet tank and bowl. The third port of the valve 4 is attached to one end of the first length of tubing 6, which is attached at the other end to the inlet port 10 of the basin 2. The second length of tubing 8 is configured to be attached at a first end to the outlet port 12 of the basin 2. During normal operation, the valve 4 allows water from the main water line 16 to flow freely to the toilet tank via the flush line. That is, the toilet is allowed to flush conventionally when the flush lever or button is pressed. However, when actuated, the valve 4 instead diverts the water from the main line 16 to the first length of tubing 6, allowing water supplied by the main water line 16 to flush away trine present in the basin 2 through the second length of tubing 8 via the outlet port 12 of the basin 2.

Such three-port valves are common and well-known to those of skill in the art. For example, Webstone manufactures a line of 3-way ball valves that would be suitable for use as a component of the invention as described. Some of these valves, for example, have a "T" configuration and operate using a level as a means of diverting an incoming fluid from one output port to the other Valves having other actuating mechanisms, such as buttons or knobs, can be used as a component of the invention. A T-connector can be selected that includes a valve that is biased in one direction, so that when actuated to divert fluid into the other direction, the biasing mechanism brings the valve back to the original position in a timed manner. For example, a switch pushing against an attached internal spring can be used to divert the fluid toward the second direction, and over time the spring will push the diverter back to its original position. Alternatively, an electronically switchable valve with a timer and a push-button actuator can be used. In this way, the amount of fluid that is diverted can be a measured amount, and if the biasing is adjustable, the measured amount can be selectable. This would allow for a measured flow amount to the basin per flush, avoiding a potential waste of water.

The second length of tubing 8, which is attached at the first end to the outlet port 12 of the basin 2, can be configured such that a second end can be disposed in an S-bend of the toilet, below a low point of the S-bend. Thus, urine washed from the basin 2, and the water used to wash it from the basin 2, flow through the second length of tubing 8 and out of the toilet as flushed water normally would.

In operation, a person would sit to urinate into the basin 2 at the front of the toilet. When urination is finished, the user actuates the valve 4 to divert water from the flush line to the basin 2 via the first length of tubing 6. If the valve 4 is biased, the user would only momentarily actuate the valve 4, which would return to the original position after allowing a measured amount of water to flow to the basin 2, sufficient to flush the basin 2 of urine. If the valve 4 is not biased, the user would manually return the valve 4 to the original position after determining that the basin 2 has been sufficiently flushed. If the toilet is used for the elimination of solid waste, the toilet is flushed in the usual manner.

As described above, the invention is an assembly that is coupled to an existing conventional toilet. However, the basin 2 can be integrated with the toilet or the seat as part of a new toilet design according to the invention. In this case, the toilet assembly includes a bowl 14, the basin 2, the three-port valve 4, the first length of tubing 6, and the second length of tubing 8. As with a conventional toilet, the bowl has an inlet port configured to be coupled to a second end of a flush line, and an outlet port having an S-bend. Similarly to the previously described embodiment, the basin 2 has an inlet port 10 and an outlet port 12 and is coupled to an inside edge of the bowl 14 onto a seat, which can be fixed in the downward position or formed as an integrated component of the toilet. The first length of tubing 6 is attached at a first end to the valve 4 and at a second end to the inlet port 10 of the basin 2. The second length of tubing 8 is attached at a first end to the outlet port 12 of the basin 2. A second end of the second length of tubing 8 is disposed below a low point of the S-bend. This embodiment of the invention functions the same as the embodiment above.

Likewise, the invention can be simply embodied as a basin 2 as described above that has an inlet port 10 and an outlet port 12 and is configured to be coupled to an inside edge of a bowl and/or seat of the toilet. Alternatively, the invention can be embodied as a toilet seat that is configured to be coupled to the body of the toilet, and which includes the basin 2, which is coupled to, attached to, or integrally formed with an inside front edge of the sitting surface of the seat.

Particular exemplary embodiments of the present invention have been described in detail. These exemplary embodiments are illustrative of the inventive concept recited in the appended claims, and are not limiting of the scope or spirit of the present invention as contemplated by the inventor.

I claim:

1. A water-saving accessory for a toilet, comprising:
   a basin, having an inlet port and an outlet port and configured to be coupled to at least one of an inside edge of a bowl of the toilet and an inside edge of a seat of the toilet;
   a three-port valve, configured to be coupled to a fluid supply line;
   a first length of tubing, configured to be attached at a first end to the valve and at a second end to the inlet port of the basin; and
   a second length of tubing, configured to be attached at a first end to the outlet port of the basin.

2. The water-saving accessory of claim 1, wherein the first length of tubing is attached to the inlet port of the basin.

3. The water-saving accessory of claim 1, wherein the second length of tubing is attached to the outlet port of the basin.

4. The water-saving accessory of claim 1, wherein the first length of tubing is attached at the first end to the valve.

5. The water-saving accessory of claim 1, wherein the valve is also configured to be coupled to a flush line for the toilet bowl such that fluid is normally supplied from the fluid supply line to the flush line.

6. The water-saving accessory of claim 5, wherein the valve is configured to be actuatable to divert fluid from the fluid supply line to the first length of tubing.

7. The water-saving accessory of claim 6, wherein the valve is configured to be actuatable to divert a measured amount of fluid from the fluid supply line to the first length of tubing.

8. The water-saving accessory of claim 7, wherein the valve is an electronically switchable valve having an adjustable actuation time such that the measured amount is selectable.

9. The water-saving accessory of claim 1, wherein the second length of tubing is configured such that a second end can be disposed in an S-bend of the toilet, below a low point of the S-bend.

10. The water-saving accessory of claim 1, wherein the basin is constructed from one or more materials including at least one of plastic, ceramic, and metal.

11. A toilet, comprising:
- a bowl, having an inlet port configured to be coupled to a second end of a flush line, and an outlet port having an S-bend;
- a basin, having an inlet port and an outlet port; and
- the water-saving accessory of claim 1;
- wherein the first length of tubing is attached at the first end to the valve and at the second end to the inlet port of the basin;
- wherein the second length of tubing is attached at the first end to the outlet port of the basin; and
- wherein a second end of the second length of tubing is disposed below a low point of the S-bend.

12. The toilet of claim 11, wherein the basin is coupled to an inside edge of the bowl.

13. The toilet of claim 11, wherein the basin is formed integrally with the bowl, at an inside edge of the bowl.

14. The toilet of claim 11, further comprising a seat that is coupled to the bowl, wherein the basin is coupled to an inside edge of the seat.

15. The toilet of claim 11, further comprising a seat that is coupled to the bowl, wherein the basin is formed integrally with the seat, at an inside edge of the seat.

16. The toilet of claim 11, wherein the valve is configured such that fluid is normally supplied from the fluid supply line to the flush line.

17. The toilet of claim 16, wherein the valve is configured to be actuatable to divert fluid from the fluid supply line to the first length of tubing.

18. The toilet of claim 17, wherein the valve is configured to be actuatable to divert a measured amount of fluid from the fluid supply line to the first length of tubing.

19. The toilet of claim 18, wherein the valve is an electronically switchable valve having an adjustable actuation time such that the measured amount is selectable.

20. The toilet of claim 11, wherein the basin constructed from one more materials including at least one of plastic, ceramic, and metal.

21. A toilet seat, comprising:
- a sitting surface, configured to be coupled to a body of a toilet and to support a person sitting on the sitting surface; and
- the water-saving accessory of claim 1;
- wherein the basin is coupled, attached, or integrally formed to an inside edge of the sitting surface.

* * * * *